(12) United States Patent
Li et al.

(10) Patent No.: US 12,405,156 B2
(45) Date of Patent: *Sep. 2, 2025

(54) COLORLESS DISTRIBUTED FIBER OPTIC SENSING / DISTRIBUTED VIBRATION SENSING

(71) Applicant: NEC Laboratories America, Inc., Princeton, NJ (US)

(72) Inventors: Yaowen Li, Princeton, NJ (US); Jian Fang, Princeton, NJ (US); Shuj Murakami, Monmouth Junction, NJ (US); Philip Ji, Cranbury, NJ (US); Ting Wang, West Windsor, NJ (US)

(73) Assignee: NEC Corporation, Tokyo (JP)

( * ) Notice: Subject to any disclaimer, the term of this patent is extended or adjusted under 35 U.S.C. 154(b) by 318 days.

This patent is subject to a terminal disclaimer.

(21) Appl. No.: 17/987,822

(22) Filed: Nov. 15, 2022

(65) Prior Publication Data
US 2023/0152151 A1    May 18, 2023

Related U.S. Application Data

(60) Provisional application No. 63/313,060, filed on Feb. 23, 2022, provisional application No. 63/280,710, filed on Nov. 18, 2021.

(51) Int. Cl.
*G01H 9/00*    (2006.01)
*G01D 5/353*   (2006.01)

(52) U.S. Cl.
CPC ........ *G01H 9/004* (2013.01); *G01D 5/35361* (2013.01)

(58) Field of Classification Search
USPC .......................................... 73/655
See application file for complete search history.

(56) References Cited

U.S. PATENT DOCUMENTS

| | | | |
|---|---|---|---|
| 11,237,025 B2 * | 2/2022 | Issa | G01H 9/004 |
| 11,920,975 B2 * | 3/2024 | Ip | H04B 10/071 |
| 2020/0158543 A1 * | 5/2020 | Koste | G01D 5/35358 |
| 2022/0113169 A1 * | 4/2022 | Issa | G01B 11/18 |
| 2023/0152543 A1 * | 5/2023 | Han | G01M 5/0091 |
| | | | 385/100 |

* cited by examiner

*Primary Examiner* — Clayton E. LaBalle
*Assistant Examiner* — Warren K Fenwick
(74) *Attorney, Agent, or Firm* — Joseph Kolodka

(57) ABSTRACT

Systems, methods, and structures for colorless distributed fiber optic sensing/distributed vibration sensing (DOFS/DVS) over dense wavelength division multiplexing (DWDM) telecommunications facilities that operate over a C-band wavelength range spanning from 1525 nm to 1565 nm wherein the DOFS/DVS systems exhibit suitable reconfigurability of its wavelength to match a wavelength of a desired testing channel providing DOFS/DVS capabilities to existing DWDM communications infrastructure as a retrofit. The DFOS/DVS systems include an optical sensor fiber; a colorless DFOS/DVS interrogator in optical communication with the optical sensor fiber and configured to generate optical pulses, introduce the generated pulses into the optical sensor fiber, and receive backscattered signals from the optical sensor fiber; and an intelligent analyzer configured to analyze colorless DFOS/DVS data received by the DFOS/DVS interrogator and determine from the backscattered signals, vibrational activity occurring at locations along the optical sensor fiber.

9 Claims, 7 Drawing Sheets

COLORLESS DISTRIBUTED FIBER OPTIC SENSING / DISTRIBUTED VIBRATION SENSING

CROSS REFERENCE

This application claims the benefit of U.S. Provisional Patent Application Ser. No. 63/280,710 filed 18 Nov. 2021 and U.S. Provisional Patent Application Ser. No. 63/313,060 filed 23 Feb. 2022 the entire contents of each being incorporated by reference as if set forth at length herein.

TECHNICAL FIELD

This disclosure relates generally to distributed fiber optic sensing (DFOS) systems, methods, and structures. More particularly, it discloses systems and methods providing colorless distributed fiber optic sensing/distributed vibration sensing (DVS).

BACKGROUND

Distributed fiber optic sensing and its variants including distributed vibration sensing have found widespread applicability in a number of contemporary applications including infrastructure monitoring, security—intrusion detection, traffic monitoring, strain and temperature measurement—among others. Given such significance, improvements in DFOS/DVS would be a welcome addition to the art.

SUMMARY

An advance in the art is made according to aspects of the present disclosure directed to colorless distributed fiber optic sensing/distributed vibration sensing (DOFS/DVS) systems, methods, and structures.

Colorless DFOS/DVS systems according to the present disclosure include a length of optical sensor fiber; a colorless DFOS/DVS interrogator in optical communication with the optical sensor fiber, said colorless DFOS/DVS interrogator configured to generate optical pulses, introduce the generated pulses into the length of optical sensor fiber, and receive backscattered signals from the length of the optical sensor fiber; and an intelligent analyzer configured to analyze colorless DFOS/DVS data received by the DFOS/DVS interrogator and determine from the backscattered signals, vibrational activity occurring at locations along the length of the optical sensor fiber.

In sharp contrast to the prior art, systems and methods and structures according to aspects of the present disclosure provide DOFS/DVS over dense wavelength division multiplexing (DWDM) telecommunications facilities that operate over a C-band wavelength range spanning from 1525 nm to 1565 nm and the DOFS/DVS systems exhibit suitable reconfigurability of its wavelength to match a wavelength of a desired testing channel.

In further contrast, systems, methods, and structures according to aspects of the present disclosure provide DOFS/DVS capabilities to existing communications infrastructure as a retrofit.

Finally, systems, methods, and structures according to aspects of the present disclosure may advantageously provide an optical gain profile control to a returning backscattered optical signal prior to photodetection and Analog-to-Digital conversion to eliminate noise and—together with the optical gain profile control—to use a low noise Erbium-doped fiber amplifier (EDFA) to optical amplify returned backscattered optical signals to obtain a better signal.

BRIEF DESCRIPTION OF THE DRAWING

A more complete understanding of the present disclosure may be realized by reference to the accompanying drawing in which.

DESCRIPTION

Figure 1:
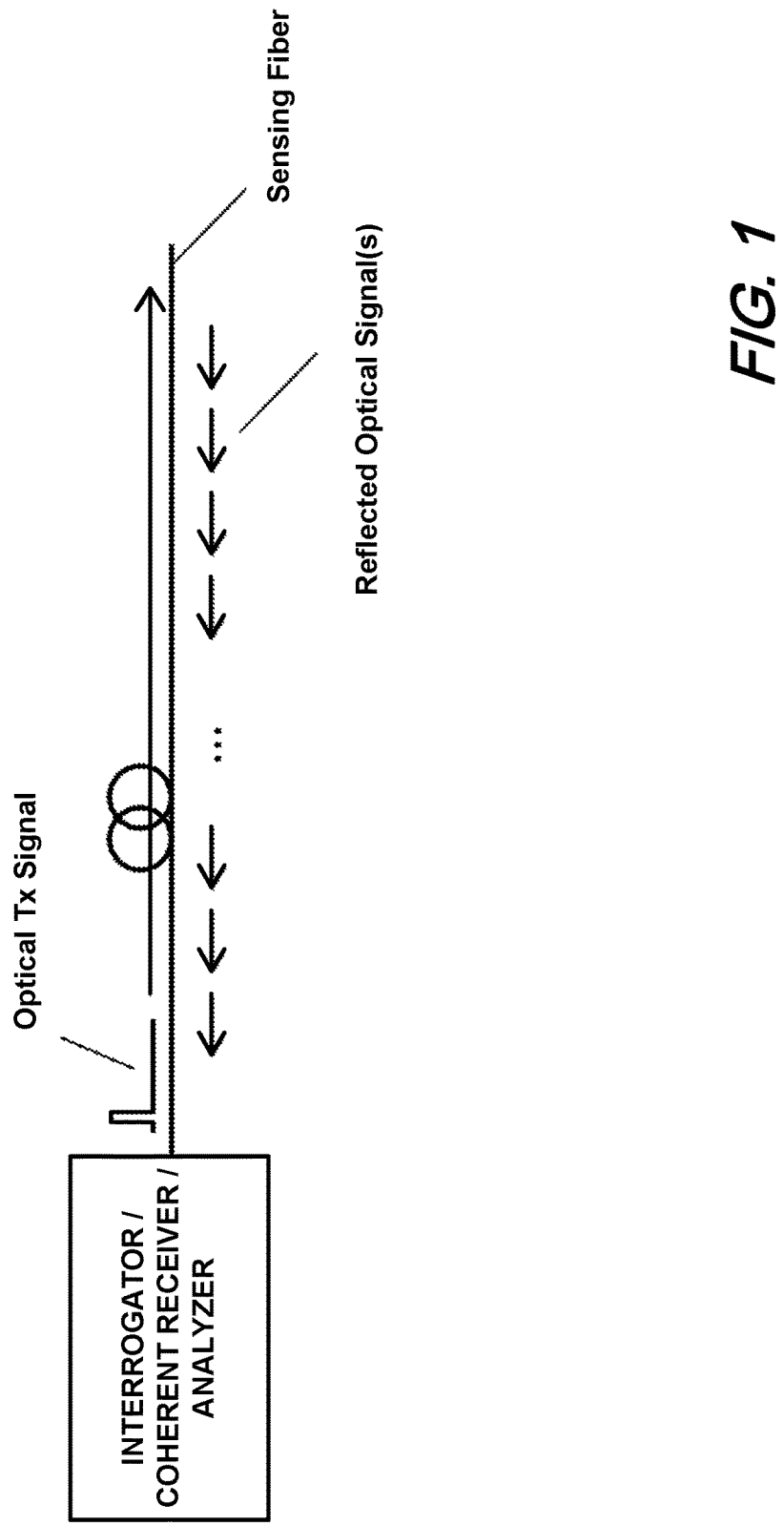
FIG. 1 is a schematic diagram showing an illustrative DFOS system according to aspects of the present disclosure.

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, we begin by noting that distributed fiber optic sensing (DFOS) is an important and widely used technology to detect environmental conditions (such as temperature, vibration, acoustic excitation vibration, stretch level etc.) anywhere along an optical fiber cable that in turn is connected to an interrogator. As is known, contemporary interrogators are systems that generate an input signal to the fiber and detects/analyzes the reflected/scattered and subsequently received signal(s). The signals are analyzed, and an output is generated which is indicative of the environmental conditions encountered along the length of the fiber. The signal(s) so received may result from reflections in the fiber, such as Raman backscattering, Rayleigh backscattering, and Brillion backscattering. DFOS can also employ a signal of forward direction that uses speed differences of multiple modes. Without losing generality, the following description assumes reflected signal though the same approaches can be applied to forwarded signal as well.

FIG. 1 is a schematic diagram of a generalized, DFOS system. As will be appreciated, a contemporary DFOS system includes an interrogator that periodically generates optical pulses (or any coded signal) and injects them into an optical fiber. The injected optical pulse signal is conveyed along the optical fiber.

At locations along the length of the fiber, a small portion of signal is reflected and conveyed back to the interrogator. The reflected signal carries information the interrogator uses to detect, such as a power level change that indicates—for example—a mechanical vibration. While not shown in detail, the interrogator may include a coded DFOS system that may employ a coherent receiver arrangement.

The reflected signal is converted to electrical domain and processed inside the interrogator. Based on the pulse injection time and the time signal is detected, the interrogator determines at which location along the fiber the signal is coming from, thus able to sense the activity of each location along the fiber.

Those skilled in the art will understand and appreciate that by implementing a signal coding on the interrogation signal enables the sending of more optical power into the fiber which can advantageously improve signal-to-noise ratio (SNR) of Rayleigh-scattering based system (e.g. distributed acoustic sensing (DAS) or distributed vibration sensing (DVS)) and Brillouin-scattering based system (e.g. Brillouin optical time domain reflectometry or BOTDR).

As currently implemented in many contemporary implementations, dedicated fibers are assigned to DFOS systems in fiber-optic cables—physically separated from existing optical communication signals which are conveyed in different fiber(s). However, given the explosively growing bandwidth demands, it is becoming much more difficult to economically operate and maintain optical fibers for DFOS operations only. Consequently, there exists an increasing interest in integrating communications systems and sensing systems on a common fiber that may be part of a larger, multi-fiber cable or a common fiber that simultaneously carries live telecommunications traffic in addition to the DFOS data.

Operationally, we assume that the DFOS system will be Rayleigh-scattering based system (e.g., distributed acoustic sensing or distributed vibration sensing) and Brillouin-scattering based system (e.g., Brillouin optical time domain reflectometry or BOTDR) and may include a coding implementation. With such coding designs, such systems will be most likely be integrated with fiber communication systems due to their lower power operation and will also be more affected by the optical amplifier response time.

Advantageously, the DFOS operation may also be integrated together with communication channels via WDM in the same fiber. Inside the sensing fiber, the interrogation sequence and the returned sensing signal may be optically amplified—either via discrete (EDFA/SOA) or distributed (Raman) methods. A returned sensing signal is routed to a coherent receiver after amplification and optical band-pass filtering. The coherent receiver detects the optical fields in both polarizations of the signal, down-converting them to 4 baseband lanes for analog-to-digital conversion (ADC) sampling and digital signal processor (DSP) processing. As those skilled in the art will readily understand and appreciate, the decoding operation is done in the DSP to generate the interrogated Rayleigh or Brillouin response of the fiber, and any changes in the response are then identified and interpreted for sensor readouts.

With such configurations, since the coded interrogation sequence is generated digitally, the out-of-band signal is also generated digitally, and then combined with the code sequence before waveforms are created by a DAC. When generated together digitally, the out-of-band signal will only be generated outside a time period of the code sequence, so when added together, the combined waveform will have a constant amplitude.

As those skilled in the art will understand and appreciate, DFOS/DAS/DVS systems have been shown to detect, record and listen to acoustic vibrations in the audible frequency range.

We note that Dense Wavelength Division Multiplexing (DWDM) technologies have been widely implemented in fiber optic communications facilities. With such facilities, a C-band wavelength range spans from 1525 nm to 1565 nm, and each channel has a specific wavelength in this range. For a DFOS/DVS to operate in this existing infrastructure, it must have the ability to configure its wavelength to match the wavelength of a testing channel. Thus, there exists the need for a colorless DVS.

We also note that transponders used in existing communication infrastructures include lasers, amplifiers and pulsing devices which may be available to launch required optical signals for DFOS/DVS vibration sensing purposes. To perform distributed vibration sensing in such existing infrastructure(s), only a colorless DVS receiving module having a wavelength configured in a DWDM wavelength range is needed.

Figure 2:
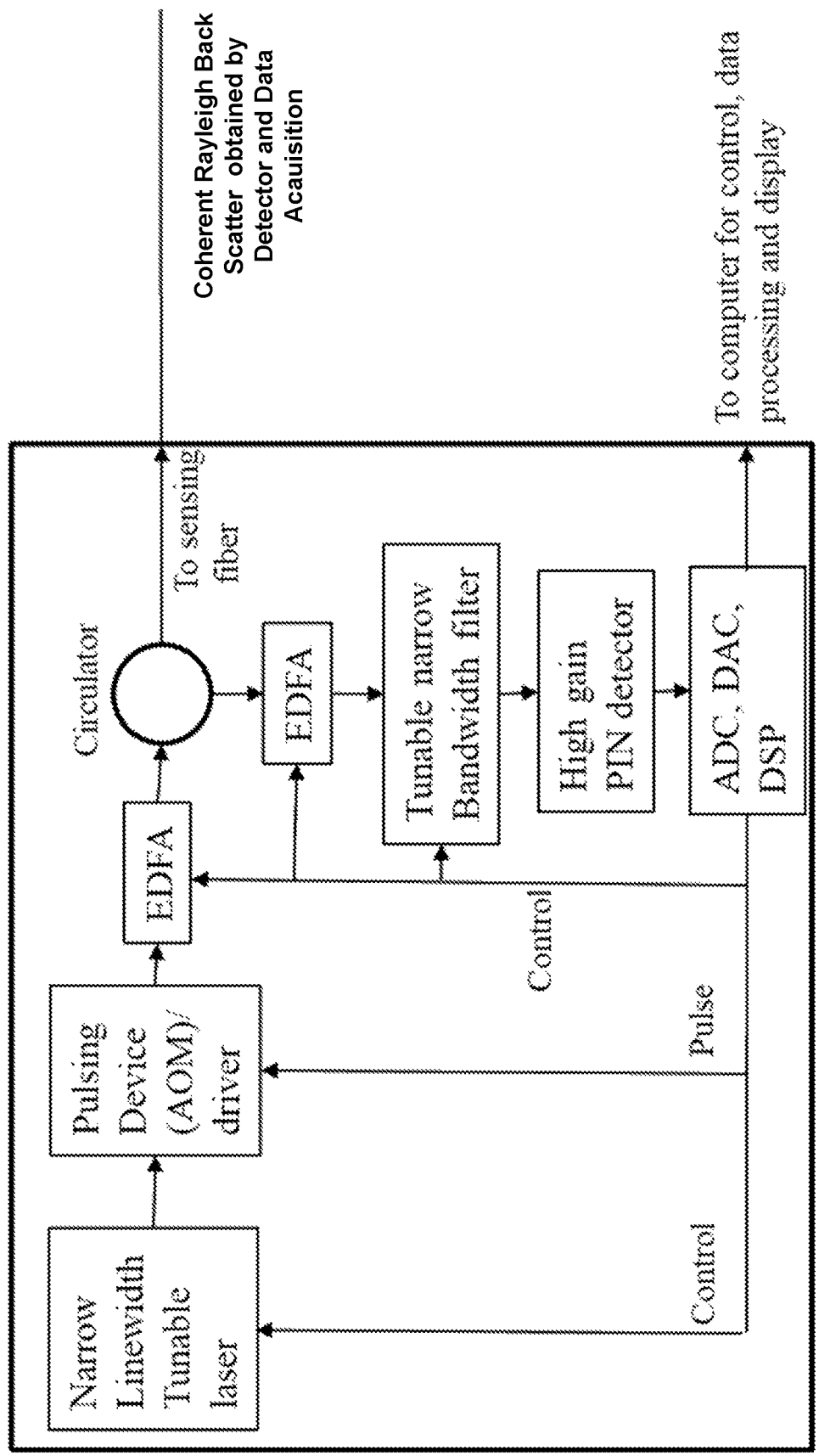
FIG. 2 is a schematic diagram showing an illustrative colorless DVS system diagram according to aspects of the present disclosure.

FIG. 2 is a schematic diagram showing an illustrative colorless DVS system diagram according to aspects of the present disclosure.

With reference to that figure, we note that for the colorless DVS, a narrow linewidth tunable laser source, two erbium-doped fiber amplifiers and a narrow bandwidth tunable filter, all covering the full C-band wavelengths, are designed in the system. The tunable laser source has at least 100 KHz or better linewidth. The tunable filter has a bandwidth of <=10 GHz and out-of-band isolation of >40 dB to ensure the colorless DVS with high sensitivity.

Figure 3:
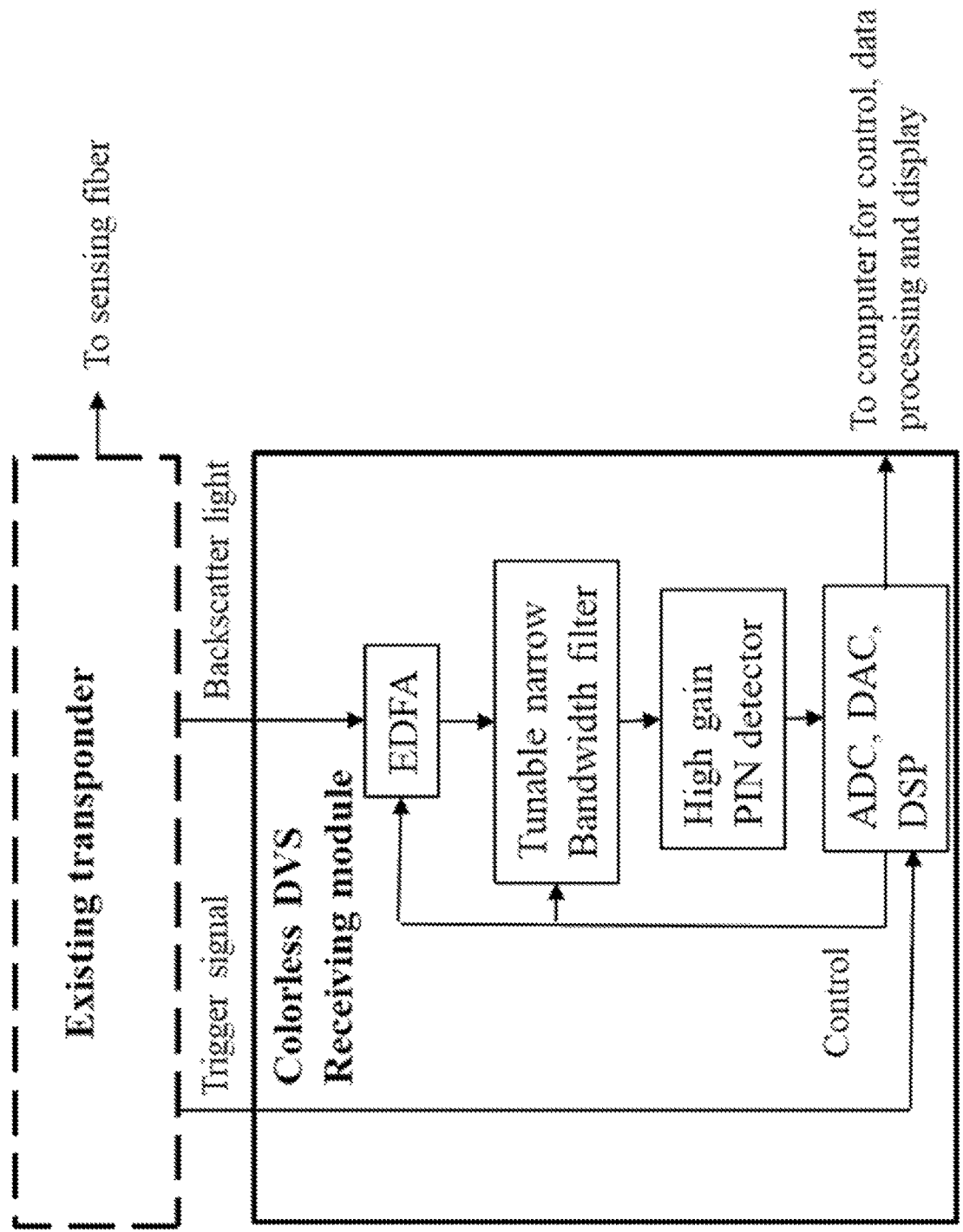
FIG. 3 is a schematic diagram showing an illustrative colorless DVS receiver according to aspects of the present disclosure.

The receiver of a colorless DVS can be configured as standalone and perform the distributed vibration sensing when the existing transponder can generate the required optical sensing pulse signal FIG. 3 is a schematic diagram showing an illustrative colorless DVS receiver according to aspects of the present disclosure. As shown in that figure, a colorless DVS receiver including EDFA, tunable narrow bandwidth filter, High Gain PIN detector, and ADC,DAC, DSP is interfaced to an existing transponder via trigger signal path and backscatter light paths.

Figure 4:
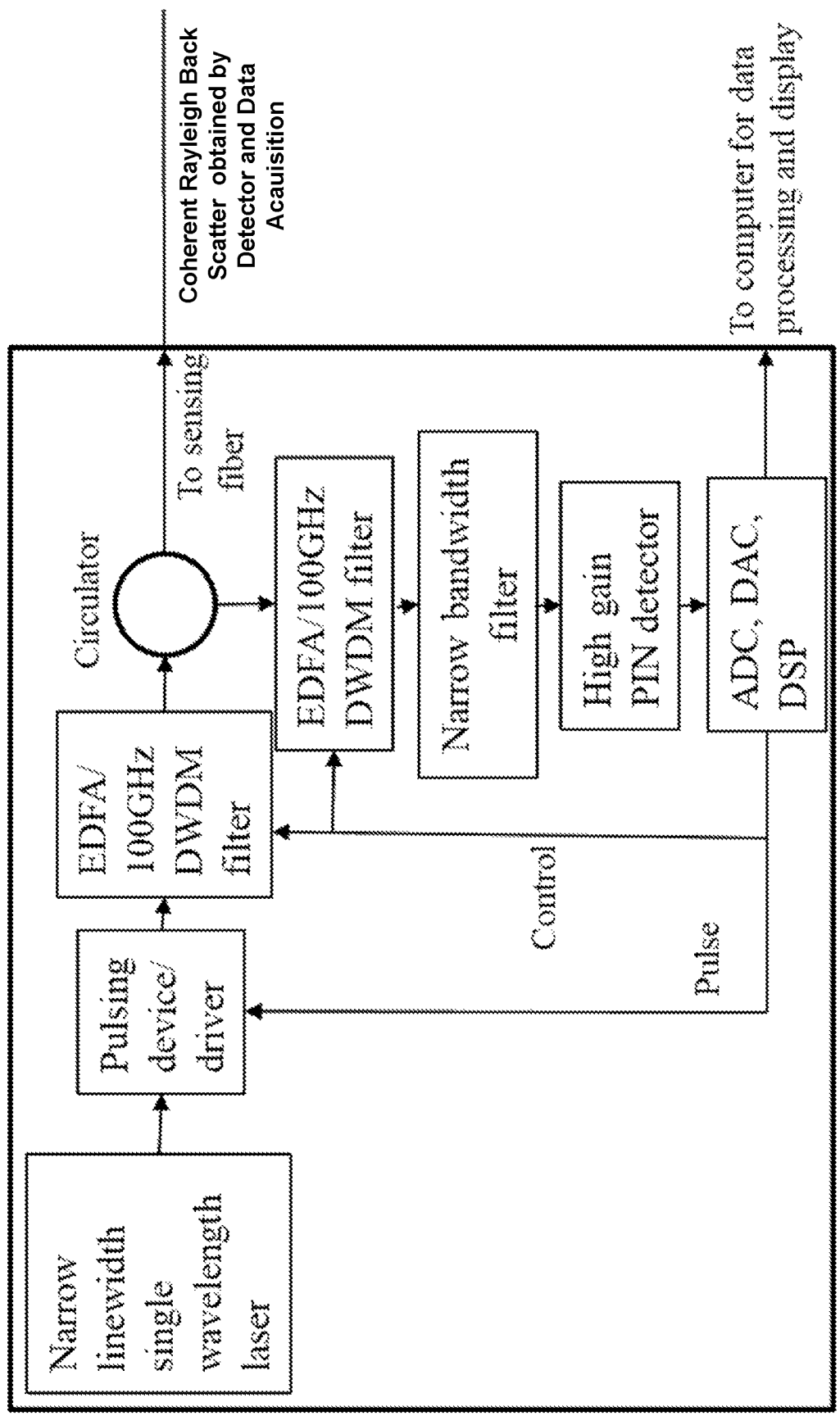
FIG. 4 is a schematic diagram showing an illustrative highly sensitive DVS with fixed wavelength arrangement according to aspects of the present disclosure.

FIG. 4 is a schematic diagram showing an illustrative highly sensitive DVS with fixed wavelength arrangement according to aspects of the present disclosure.

As is schematically illustrated in the figure, DVS operation principles are based on Rayleigh back scattering light and coherent optical time domain reflectometer (C-OTDR). A narrow linewidth laser beam is sent to a pulsing device, such as an AOM, to obtain optical pulses with certain repetition rate and pulse width. The EDFA with a built-in 100 GHz DWDM filter amplifies the optical pulses and sends them through a circulator to the sensing fiber. The Rayleigh backscatter light returns through the circulator and to the receiving EDFA with a built-in 100 GHz DWDM filter. This EDFA amplifies the returning backscatter light, and the amplified light passes through a narrow bandwidth (<=10 GHz) filter (usually an Etalon filter) to a high gain PIN detector. The 100 GHz DWDM filter, together with the narrow bandwidth Etalon filter, ensures the narrow bandwidth filtering with a high out-of-band isolation. The detector output is sent to data acquisition and processing. The narrow linewidth laser beam, pulse with a high extinction ratio and narrow bandwidth filtering with high out-of-band isolation are the key factors for the highly sensitive DVS.

The theoretical basis of the DVS technology can be explained by the in-pulse coherent interference and OTDR technology. An optical pulse travels through optical fiber and—at an instant moment in time—the optical pulse traverses a certain length of optical fiber at which Rayleigh backscatter occurs at every point in this length of fiber. All the backscatter returns to a point thereby producing the optical interference. The intensity of the interference changes with the relative optical phase changes among the backscatter. External vibration to the fiber changes the optical phase of each backscatter, and thus the intensity of the interference. By detecting this intensity change along the fiber and using the OTDR technique to determine the location, we can identify and locate the external vibration events Replacing the laser with a narrow linewidth tunable laser, such as the integrated tunable laser assembly (ITLA), removing both 100 GHz DWDM filters in the two EDFAs and replacing the narrow bandwidth filter with a narrow bandwidth tunable filter with high out-of-band isolation, a colorless and highly sensitive DVS and a colorless DVS receiver can be configured as illustratively shown in FIG. 2. When the tuning range of the tunable laser and filter and the EDFAs cover the complete C-band, the illustrative system is suitable for the entire C-band. When tuning range of the tunable laser and filter and the EDFAs cover the complete C+L band, the illustrative system is suitable for the whole C+L band.

Figure 5:
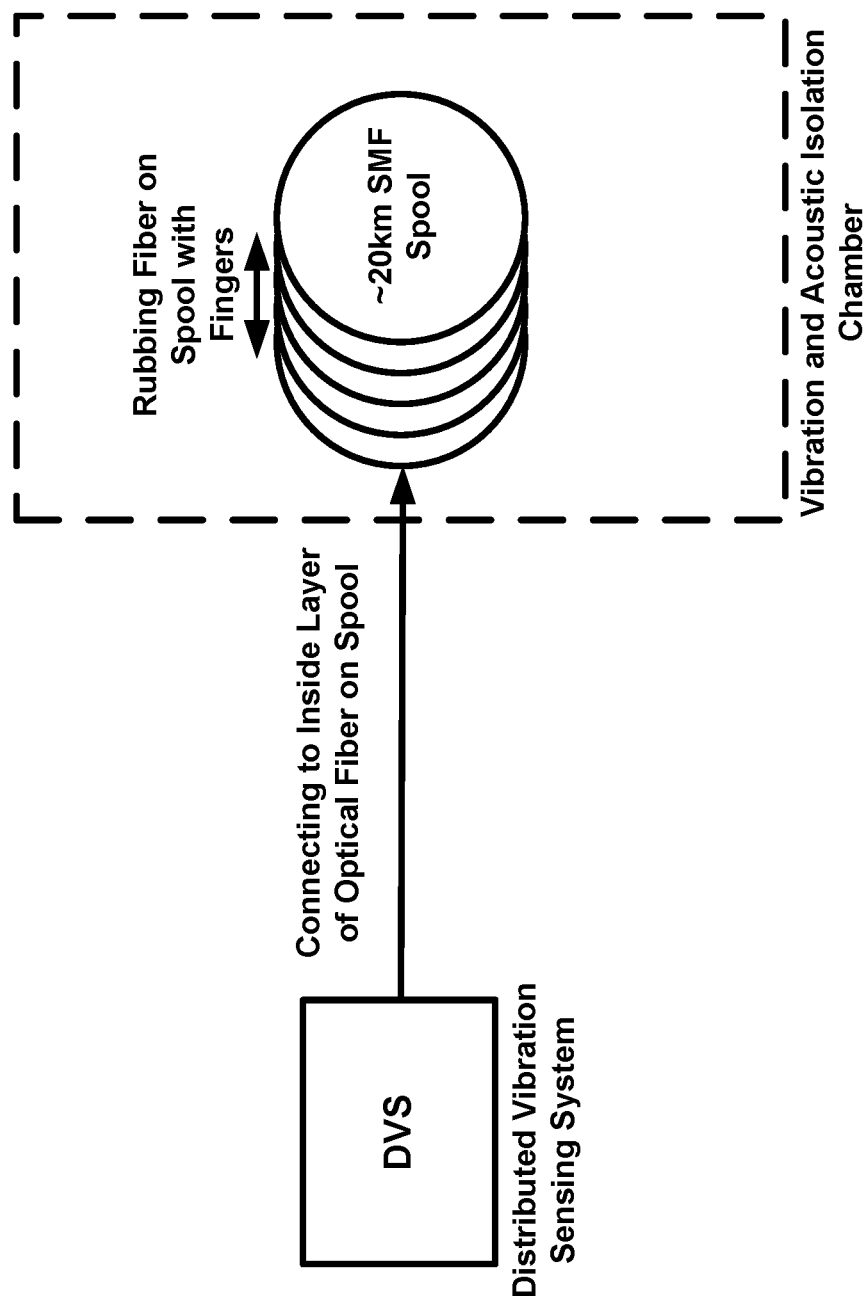
FIG. 5 is a schematic diagram showing an illustrative experimental arrangement for evaluating colorless DVS according to aspects of the present disclosure.

To evaluate the colorless DVS, we designed and performed the same experiments to compare the performance of the traditional DVS and colorless DVS. The experimental configuration is illustrated in FIG. 5.

With reference to that figure, shown therein is a ~20 km fiber spool is connected to DVS and the vibration/strain to the fiber is produced by fingers rubbing the outside layer of the fiber spool. When the fingers press the starting point of the outside layer of the fiber, they also press the starting point of the third, fifth, . . . layers of the fiber. Thus, rubbing the fiber induces a periodic strain pattern in the fiber against the time and along the fiber length. The period along the fiber length is the length of two layers of the fiber on the spool.

To visually display the vibration/strain data, DVS employs a so-called waterfall plot. With such waterfall plot, the horizontal axis indicates fiber location/length while the vertical axis indicates elapsing time/DVS measurement record. The amplitude at each sampling point is scaled by a color map with black for the smaller one and white for the larger one.

We evaluated our inventive configuration and compared its performance with traditional DVS by generated waterfall plots of traditional DVS with an ITLA set at 1550.12 nm as the laser source wherein the laser source has <20 KHz linewidth specified by the manufacturer.

The same ITLA and a tunable filter, covering the whole C-band, were used in the colorless DVS tests. The tunable filter had a bandwidth of <=10 GHz and >40 dB out-of-band isolation.

After constructing the colorless DVS, we conducted the same tests for three wavelengths, 1528.77 nm, 1542.14 nm and 1556.55 nm. Compared with the results from the traditional DVS, the colorless DVS results have similar signal to noise ratio (SNR), and thus a similar high sensitivity. By using the ITLA and tunable filter, covering C+L band, we can construct a colorless DVS for C+L band with high sensitivity.

To achieve long distance sensing, such as 40$km$ or beyond, the sensors usually employ Raman distributed amplifications to compensate part of the signal loss and boost the returning signal. However, in some applications, there are safety requirements which prevent the sensor from using the high power Raman pump light. Without distributed Raman amplifications, compared to that at the beginning of the long sensing fiber, the returning signal for the sensor will have a big loss at the end. This, together with the dynamic range limits of the sensor components, such as the photodetector and analogue-to-digital-convertors (ADC), result in the sensor not only being unable to obtain a good signal at the end, but unable to monitor the whole sensing length in the same thresholds as well.

Electrical gain profile control techniques have been reported in some sensor systems. They are implemented after the optical signal is converted to an electrical signal by the detector. The detector, together with its amplifiers usually are designed to have low noises, and thus usually limit its maximum output. Further amplifications are usually needed to magnify the signal at the end before or after implementing the electrical gain profile control. Thus, not only does the signal being amplified have the original optical noises, but the noises of the detector and its amplifiers as well. This will prevent the sensor systems from realizing the best performance possible.

As we shall further show and describe, our inventive approach to this problem is to apply optical gain profile control to the returning optical signal before it reaches the photodetector and ADC so that the noises will be minimized; and—together with the optical gain profile control—to use a low noise Erbium doped fiber amplifier (EDFA) to optically amplify the returning optical signal more and thus obtain better signal.

Optical gain profile control is achieved by using a high speed and fast response variable optical attenuator (VOA). By designing/implementing the input profile to the VOA using an arbitrary waveform generator (AWG), the attenuation profile can be tailored to achieve the optical gain profile control requirements for the returning signal.

To demonstrate the optical gain profile control technique, we use the fiber optic distributed vibration sensor (DVS) as an example. The system diagram for the DVS with optical gain profile control is shown illustratively in FIG. 6 which is schematic diagram showing an illustrative DFOS/DVS system according to aspects of the present disclosure. As illustrated in the figure, a high speed and fast response VOA, together with a low noise EDFA at the receiving side, are used to achieve the desired results. The VOA may be placed before the low noise EDFA to achieve similar results.

We have noted previously with respect to FIG. 1, DVS operation principles and brief theoretical basis of same. When the sensing fiber is long, the nonlinearity limits the launching peak optical power and thus the returning light from the end of the fiber is low. Furthermore, due to the intrinsic fiber loss and the connection losses in real applications, the difference between the returning lights at the beginning and end is large. For a 40 km fiber without extra connection losses, this difference would be 16 dB to 20 dB. In the detector and data acquisition side, DVS needs to use high gain and low noise PIN detectors, and high-resolution ADCs to minimize the digitization errors. These requirements usually limit the detector output and ADC input ranges to 1 V, and thus the dynamic measurement range of DVS.

To demonstrate the DVS results by optical gain profile control, we designed and performed the same experiments to compare the performance of the regular DVS and DVS with optical gain profile control.

Figure 7:
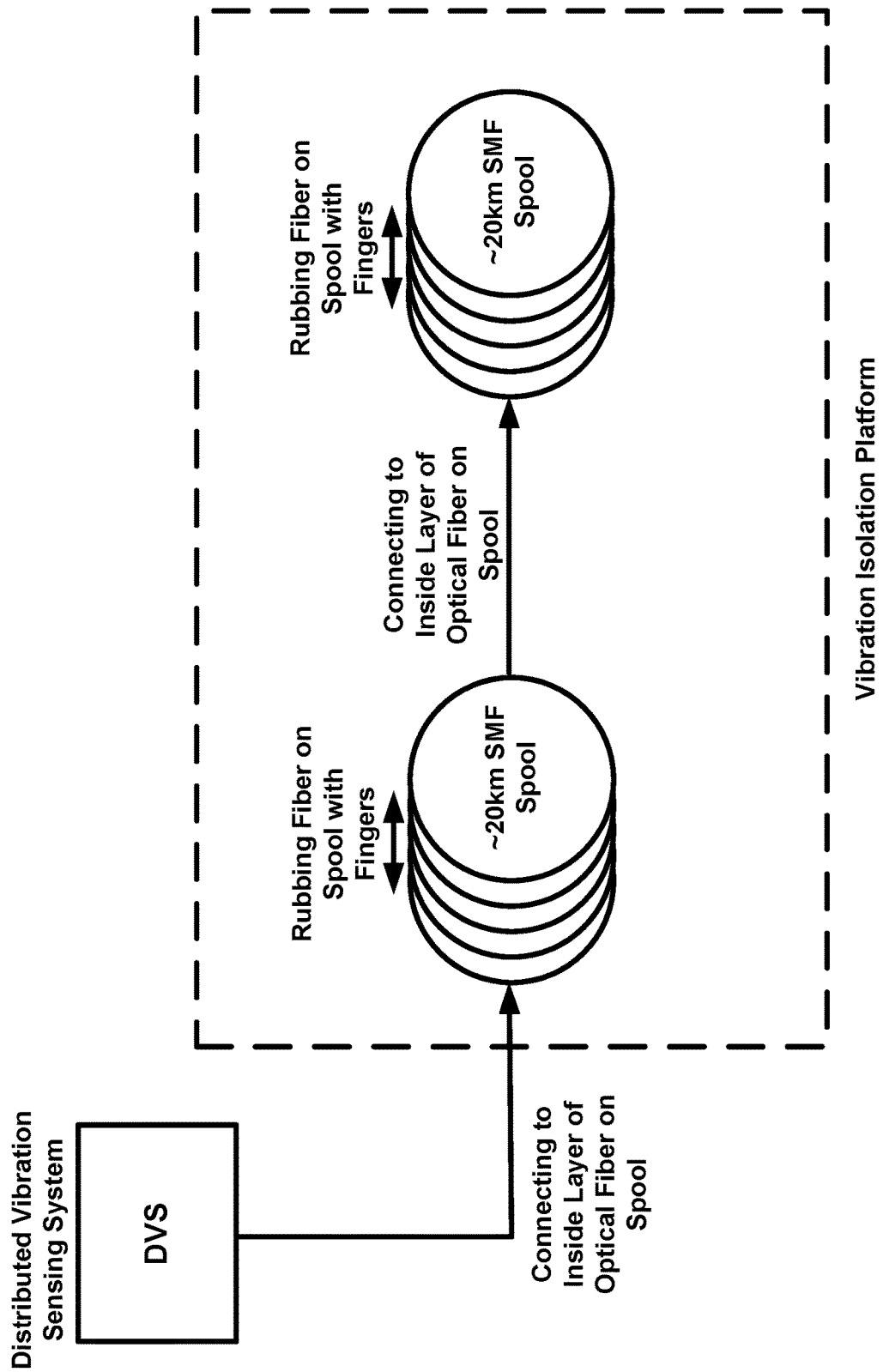
FIG. 7 is a schematic diagram showing an illustrative experimental arrangement for evaluating colorless DVS according to aspects of the present disclosure.

FIG. 7 is a schematic diagram showing an illustrative experimental arrangement for evaluating colorless DVS according to aspects of the present disclosure.

Two 20 km fiber spools are connected to DVS and the vibration/strain to the fiber is produced by fingers rubbing the outside layer of each fiber spool up and down. The connection to each fiber spool is such that the launching light inputs to the inner layer of the fiber spool. When fingers press the starting point of the outside layer of the fiber spool, they also press the starting point of the third, fifth, . . . layers of the fiber spool. Thus, rubbing the fiber up and down induces a periodic strain pattern in the fiber against the time and along the fiber length. The period along the fiber length is the length of two layers of fiber on the spool.

Algorithms are implemented to process the data acquired by ADC to obtain the vibration data. The figure below shows the typical vibration data from the regular DVS and 20 km fiber spool test in a reasonably quiet environment without applying any disturbance to the spool.

As noted previously, to visually display the vibration/strain data, DVS employs waterfall plots in which the horizontal axis indicates fiber location/length and vertical axis indicates elapsed time/DVS measurement record. The amplitude at each sampling point is scaled by a color map with black for the smaller value and white for the larger value.

When two 20 km fiber spools are connected to make 40$km$ sensing length, as illustratively shown in FIG. 7, the scattered light measured with a regular DVS such as that shown in FIG. 1, it can be found that the maximum amplitude at the beginning is mostly at ~7500 counts below 8200 count saturation value and the amplitude at the end is ~80 counts. It's ~20 dB difference.

When the experiment is performed by rubbing the first fiber spool and then the second fiber spool the maximum amplitude of the vibration data is over 50000 counts. To keep the background dark for the whole 40 km length, the minimum scale must be set at 200 counts. It can be found that in this setting, the vibration data from the second spool is very small and can't be observed for most of the length. To observe the vibration data from the second fiber spool, the minimum scale must be set at 10 counts. In this case, the noises at the beginning are very large.

Figure 6:
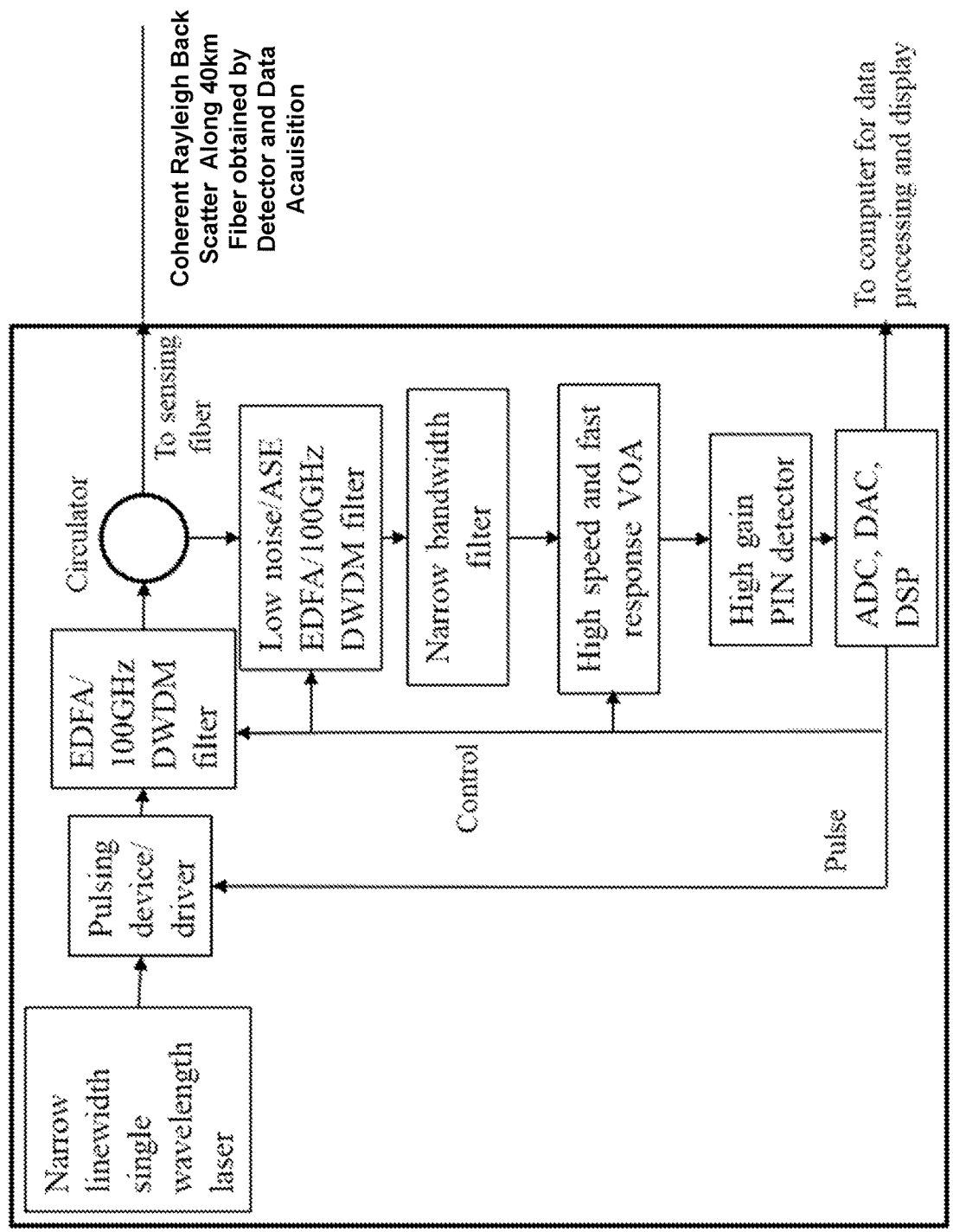
FIG. 6 is a schematic diagram showing an illustrative DFOS/DVS system according to aspects of the present disclosure.

The DVS system shown in FIG. 6 was set up to do the same tests with the two 20 km fiber spools. From the VOA input and its attenuation profiles, it can be determined that the maximum amplitude is mostly below 5000 counts and the amplitude at the end is ~500 counts. The difference is <10 dB. With a more complex VOA input profile, the difference could be much smaller.

The maximum amplitude of the vibration data is also over 50000 counts. With the minimum scale set at 200 counts, the background is dark for the whole 40 km length, and the signal can be observed in the entire 40 km length. The signal to noise ratio (SNR) is also very good for the entire 40 km length.

Adding another 20 km spool after those two 20 km spools, the DVS system was also tested for the 60 km sensing length. A similar VOA input profile to that used in the 40$km$ test was generated and implemented. The result is resampled ADC data with the maximum amplitude mostly below 7500 counts in which the vibration data with the spools in a reasonably quiet environment and without applying any disturbance to the spools. When rubbing the first spool, then the second spool, and lastly the third spool, it can be found that the maximum vibration data amplitude is still over 50000 counts. With the minimum scale set at 400 counts, the background is dark and the entire 60 km vibration signal can be observed. The signal to noise ratio for the entire 60 km length is still reasonably good. Like we observed with the 40$km$ case, with a more complex VOA input profile, the uniformity of the waterfall plot could still be improved.

As will be readily appreciated by those skilled in the art, by optimizing the VOA input profile and other system parameters, our inventive technique has the potential to improve the SNR at the end area of the long sensing length too. Furthermore, for real applications, based on the sensing route loss profiles, this technique can tailor the VOA input profiles to get the best DVS results in both the signal amplitudes and sensitivity uniformities.

The above demonstration and explanation use the DVS system as an example. For other fiber optic distributed sensing systems targeting long distance sensing applications, this optical gain profile control technique also has the potential in improving the SNR and amplitude and sensitivity uniformity. For example, in the Brillouin Optical Time Domain Reflectometry (BOTDR) system, the technique can ensure a uniform amplitude along the long sensing length for the 2-D Brillouin Gain Spectrum (BGS) map. Like the DVS case, this will be beneficial for applying the analysis and algorithms to the full sensing length.

At this point, while we have presented this disclosure using some specific examples, those skilled in the art will recognize that our teachings are not so limited. Accordingly, this disclosure should only be limited by the scope of the claims attached hereto.

The invention claimed is:

1. A colorless distributed fiber optic sensing/distributed vibration sensing (DFOS/DVS) system comprising:
    a length of optical sensor fiber;
    a colorless DFOS/DVS interrogator in optical communication with the optical sensor fiber, said colorless DFOS/DVS interrogator configured to generate optical pulses, introduce the generated pulses into the length of optical sensor fiber, and receive backscattered signals from the length of the optical sensor fiber; and
    an intelligent analyzer configured to analyze colorless DFOS/DVS data received by the DFOS/DVS interrogator and determine from the backscattered signals, vibrational activity occurring at locations along the length of the optical sensor fiber;
    wherein the colorless DFOS/DVS interrogator includes a narrow bandwidth tunable laser source.

2. The colorless DFOS/DVS system of claim 1 wherein the colorless DFOS/DVS interrogator includes a pair of erbium-doped fiber amplifiers, one configured to amplify the generated pulses before introduction into the length of optical sensor fiber and the other one configured to amplify backscattered signals received from the length of the optical sensor fiber.

3. The colorless DFOS/DVS system of claim 2 wherein the colorless DFOS/DVS interrogator includes a narrow bandwidth tunable filter configured to filter the amplified backscattered signals.

4. The colorless DFOS/DVS system of claim 3 wherein the narrow bandwidth tunable filter exhibits a bandwidth of 10 GHz and out-of-band isolation of >40 dB.

5. The colorless DFOS/DVS system of claim 3 wherein the narrow bandwidth tunable laser source, the pair of erbium-doped fiber amplifiers and the narrow bandwidth tunable filter all are configured to operate in a full C-band of wavelengths from 1525 nm to 1565 nm.

6. The colorless DFOS/DVS system of claim 5 wherein the colorless DFOS/DVS interrogator includes a pulse driver configured to generate the optical pulses from light output from the narrow linewidth tunable laser and direct the pulses to the erbium doped fiber amplifier that amplifies the optical pulses.

7. The colorless DFOS/DVS system of claim 6 wherein the colorless DFOS/DVS interrogator includes a high gain p-type, intrinsic, n-type (PIN) detector configured to receive the filtered amplified backscattered signals and generate an output signal.

8. The colorless DFOS/DVS system of claim 7 wherein the colorless DFOS/DVS interrogator includes conversion/processing circuitry configured to provide Analog-to Digital Conversion (ADC), Digital-to-Analog Conversion (DAC) and Digital Signal Processing (DSP) and narrow bandwidth tunable filter configured to filter the amplified backscattered signals.

9. The colorless DFOS/DVS system of claim 8 wherein the conversion/processing circuitry is configured to provide control signals to the erbium-doped fiber amplifiers, pulse control to the pulse driver and control signals to the narrow linewidth tunable laser.

\* \* \* \* \*